United States Patent
Tanaka et al.

(10) Patent No.: US 6,665,735 B1
(45) Date of Patent: Dec. 16, 2003

(54) METHOD OF CHANGING A DYNAMIC LINK LIBRARY FUNCTION EFFICIENTLY AND A COMPUTER SYSTEM FOR EXECUTING THE SAME

(75) Inventors: Kuninori Tanaka, Tokyo (JP); Tetsuya Iinuma, Tokyo (JP); Hideaki Hirayama, Kanagawa-ken (JP); Toshio Shirakihara, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/166,284

(22) Filed: Oct. 5, 1998

(30) Foreign Application Priority Data

Oct. 6, 1997 (JP) .............................. 9-272669

(51) Int. Cl.⁷ ................................................ G06F 9/00
(52) U.S. Cl. ........................................ 709/331; 717/163
(58) Field of Search ................................ 709/331, 332; 717/162–167

(56) References Cited

U.S. PATENT DOCUMENTS

| | | | | |
|---|---|---|---|---|
| 5,297,285 A | * | 3/1994 | Abrahamsson et al. | 709/317 |
| 5,339,430 A | * | 8/1994 | Lundin et al. | 709/317 |
| 5,386,568 A | * | 1/1995 | Wold et al. | 345/769 |
| 5,659,751 A | * | 8/1997 | Heninger | 709/332 |
| 5,787,448 A | * | 7/1998 | Anderson et al. | 707/501.1 |
| 5,845,119 A | * | 12/1998 | Kozuka et al. | 717/107 |
| 5,903,758 A | * | 5/1999 | Walker | 709/328 |
| 5,916,308 A | * | 6/1999 | Duncan et al. | 709/331 |
| 6,003,095 A | * | 12/1999 | Pekowski et al. | 717/163 |
| 6,029,207 A | * | 2/2000 | Heninger | 709/331 |
| 6,041,363 A | * | 3/2000 | Schaffer | 709/321 |

OTHER PUBLICATIONS

Pietrek "Learn System–Level Win32 Coding Teachniques By Writing an API Spy Program," Dec. 1994, pp. 1–26.*
Sorgatz "Dynamic Modules: The concept of Software Integration in MuPAD" Department of Mathematics and Computer Science University of Paderborn, Paderborn, Gemany, Jul. 11, 1997. (pp. 1–5).*
Schmerl et al. "Configuration Management for Dynamically Bound System" Department of Computer Science, Flinders University of South Australia. 1995, (pp. 1–12).*

* cited by examiner

Primary Examiner—St. John Courtenay, III
Assistant Examiner—Van Hoa Nguyen
(74) Attorney, Agent, or Firm—Finnegan, Henderson, Farabow, Garrett & Dunner, L.L.P.

(57) ABSTRACT

Methods and systems consistent with this invention link a program module, which implements dynamic linkage to an external function and executes the external function. Such methods and systems replace a function name described in a header portion of a program module and a function name to be referred to by the program module with other names, and link functions having the same names as the replaced function names and executing the linked functions in place of an original function.

15 Claims, 8 Drawing Sheets

METHOD OF CHANGING A DYNAMIC LINK LIBRARY FUNCTION EFFICIENTLY AND A COMPUTER SYSTEM FOR EXECUTING THE SAME

BACKGROUND OF THE INVENTION

1. Field of the Invention

The present invention relates to a method of changing a dynamic link library function efficiently and a computer system for executing the same.

2. Description of the Related Art

A linker is a program which links object modules, acquired by separate compiling, into a single loadable module by adjusting a reference relationship among the object modules or addresses thereof. To adjust a reference relationship among modules, a specific module registered in an object module library or a load module library is loaded as needed. In a case where a plurality of modules are linked, it is necessary to adjust the modules in such a way as to hold the adequate reference relationship among them and to allow execution of the modules to progress without problems. It is the biggest role of a linker to ensure such adjustment and link a plurality of modules into a single executable load module.

An object module does not consist only of a machine language program (the text portion), but also contains directory information called an external symbol directory and a relocation directory. Those directories are the important information sources for a linker. Registered in external symbol directory are external names and external references. The "external name" is a symbol name which can be referred to by another program module. The "external reference", is a symbol name which is not defined in a local module. As an external name and external reference can be discriminated by an instruction in a source program, a language interpreting program identifies them and puts them in an object module. Each item registered in the external symbol directory contains an associated symbol name and information on where in the associated module that symbol name is used, i.e., an address at which the symbol name is used.

A linker collates the external name of a desired object module with an external reference, and gives the address for an external name to the external reference if the same name is found. This establishes linkage of both the external name and the external reference. In some cases, however, a match may not be found by merely referring to the external symbol directory of an input object module so that an unresolved external reference remains. In such a case, the linker searches an object module library or a load module library for a module to which a matching external name belongs and loads the module into a load module, and tries to find a matching external reference at the same time.

A set of object files of a previously prepared external function is called a library. An object file is a file which results from combining an external function and is stored in the form of an object program module. A library which is automatically linked by, for example, a C compiler is called a standard library.

A program in a library may take the form of a source program or may take the form of an object file. A program is linked to another program portion before compiling in the form of a source program, and after compiling in the form of an object file. In the case of linking a program after compiling, the linking action is called a linkage. There are two linkages: one is a static linkage which links a program module before executing it and the other is a dynamic linkage which carries out linking when a program is called after its execution has started. DLL, which is the latter linkage, is called a dynamic link library function where components or the like of Windows, the operating system which has substantially become standard in the field of personal computers, are stored. DLL is a library associated with a program, and can be shared by a plurality of program modules. A program module loads a DLL module into memory and uses it, whenever necessary. This DLL file helps reduce the program size an external memory device or memory, and enjoys merit of a shorter development time because correction or the like of software bugs can be implemented by rewriting only a target DLL file.

To alter the process of a dynamic link library function (X) to be used by a program module, conventionally, a dynamic link library function (Y) which includes a process equivalent to that of the dynamic link library function (X) is generated and the program module should be so modified as to call that function.

However, a dynamic link library including the dynamic link library function (Y) should have functions equivalent to all the dynamic link library functions included in a dynamic link library which includes the dynamic link library function (X). When there is no available means which acquires source codes of the dynamic link library function (X) and makes modification based on the source codes or when the total number of dynamic link library functions included in a dynamic link library is large, an extensive developing cost is required to alter the process of the dynamic link library function (X).

SUMMARY OF THE INVENTION

Accordingly, it is an object of the present invention to efficiently alter a dynamic link library function, at the time of generating a dynamic link library including a dynamic link library function (Y), by suppressing, as much as possible, the amount of codes to be newly added or generated for other portions of the dynamic link library function (Y) than those which are to be changed.

It is another object of this invention to provide a method of changing an external function to be referred, without recompiling a program module, by altering external function reference information described in the program module, and a computer system which executes the method.

According to one aspect of this invention, in a program module, which implements dynamic linkage to an external function and executes the external function, a function name described in a header portion of a program module and a function name to be referred to by the program module are replaced with other names, and functions having the same names as the replaced function names are linked and are executed in place of an original function. Further, an original function is executed using the functions having the same names as the replaced function names, and a preprocess or a postprocess for the original function is described and is executed to thereby expand a function without altering the original function.

According to another aspect of this invention, in a library A to be dynamically linked at a time of executing a program module, a library B having the same name as the function A and including functions having the same names as functions included in the library A is dynamically linked and executed at the time of executing the program module, a library name described in the original library A and a function name, which can externally be referred to, are replaced with other names, and a function in the original library A is executed from a function in the library B and at the same time a preprocess or a postprocess is executed, whereby the preprocess or postprocess is added to a library function.

With the above structure, at the time of generating a dynamic link library including a dynamic link library function (Y), the amount- of codes to be newly added or generated for other portions of the dynamic link library function (Y) than those which are to be changed can be suppressed as much as possible. This can ensure efficient alteration of a dynamic link library function.

BRIEF DESCRIPTION OF THE DRAWINGS

The accompanying drawings, which form a part of this specification, illustrate the presently preferred embodiments and are used to explain the principle of the invention as well as to give the general description that has been given above and the detailed description of the preferred embodiments that will be discussed below.

DETAILED DESCRIPTION OF THE PREFERRED EMBODIMENTS

Figure 1:
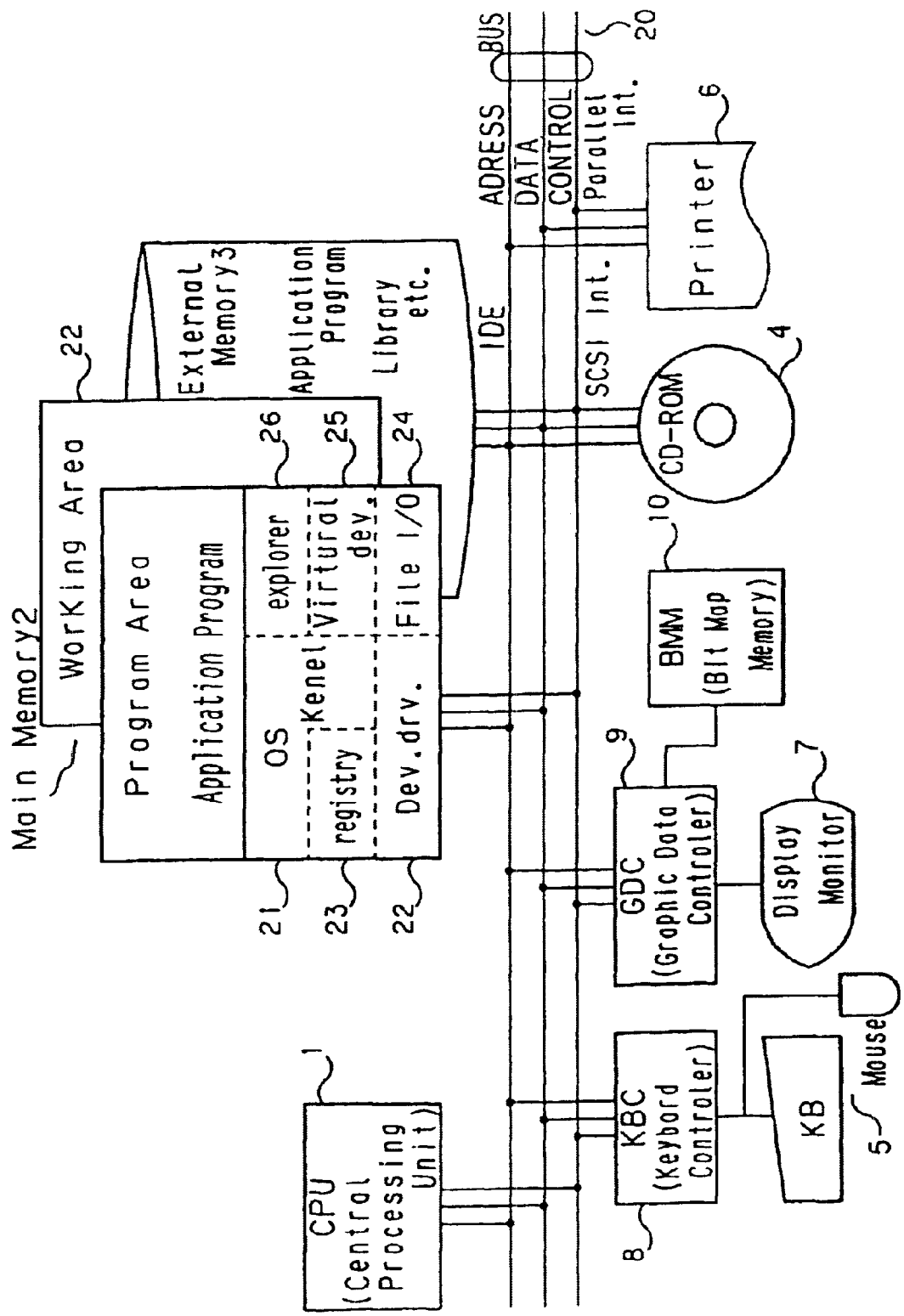
FIG. 1 is a diagram illustrating the structure of a computer system capable of efficiently changing a dynamic link library function.

The structures and operations of preferred embodiments of this invention will now be described while illustrating the developing environment on Windows 95 by Microsoft Corporation, which is substantially a standard operating system (OS) for personal computers. FIG. 1 exemplifies the structure of a computer system to be used in this invention. In the figure, a CPU 1, the control center, reads programs including an OS, which are loaded and stored in a main memory device 2, one at a time and executes them to perform operational control or control various devices connected to the computer system. In a program module for implementing dynamic linkage to an external function, which is loaded and stored in the main memory device 2 as needed, and executing the external function, the CPU 1 cooperates with the OS to replace a function name described in the header portion of the program module and a function name to be referred to by the program module with other names, link functions having the same names as the replaced function names and execute the linked functions instead of the original function. Further, the original function is executed using the functions having the same names as the replaced function names, and a preprocess or a postprocess is executed to thereby expand a function without altering the original function.

Windows 95, which is installed as a resident OS in the main memory device 2, consists mainly of the following six parts, and is allocated and stored in the main memory device 2 together with an application program (APL) to be executed. Those six parts are a resident part (kernel 21), the main body of Windows 95, a part(device driver 22) which is closer to hardware and directly exchanges commands and data with the hardware, a part (registry 23) which sets the hardware and carries set information, a control part 24 for reading and writing files, a part (virtual machine 25) for controlling the usage of devices by an application, and a part (explorer 26) which receives a command from a user or an application and returns the results. Each part is further separated, function by function, into program files and data files in the forms of modules, which are in turn allocated and stored as Windows' folders in the main memory device 2.

Various application programs and data are stored in a large-capacity hard disk unit 3 and a CD-ROM drive unit 4. The hard disk unit 3 is connected to the system via an IDE interface, and the CD-ROM drive unit 4 via an SCSI interface. Files stored in the large-capacity hard disk unit 3 and the CD-ROM drive unit 4 are read out via the file read/write control part 24 of the OS. The control part 24 also intervenes file writing in the hard disk unit 3. When one opens the Windows 95 or the large-capacity hard disk unit 3 using the explorer 26, multiple folders and/or files appear. A DLL file, which will be discussed later, is one of such files.

A mouse-equipped keyboard unit 5 and a printer 6 are connected to the system via a keyboard controller (KBC 8) and a parallel interface, respectively. Both units are managed by a file, called the virtual machine 25, in such a way as not to be owned by a single application, thus ensuring multi-tasking, and their operations are controlled by a file called the device driver 22. A display monitor 7 is connected to the system via a graphics display control LSI (GDC) 9. The graphics display control LSI transfers graphics data, developed on a working area in the main memory device 2, to a bit map memory 10, and reads and displays desired data in synchronism with the display timing. The aforementioned six parts of the OS do not operate independently, but function in cooperation with one another. A system bus 20 consists of a plurality of lines for the address, data and control. The aforementioned units 1, 2, 3, 4, 6, 8 and 9 are connected to one another by this bus.

Before going to a description of the structures and operations of the embodiments of the invention, a symbol reference relationship between an application program and a dynamic link library will be discussed. Means by which a program module refers to symbols of a dynamic link library during its execution is classified into the following two ways.

Figure 6:
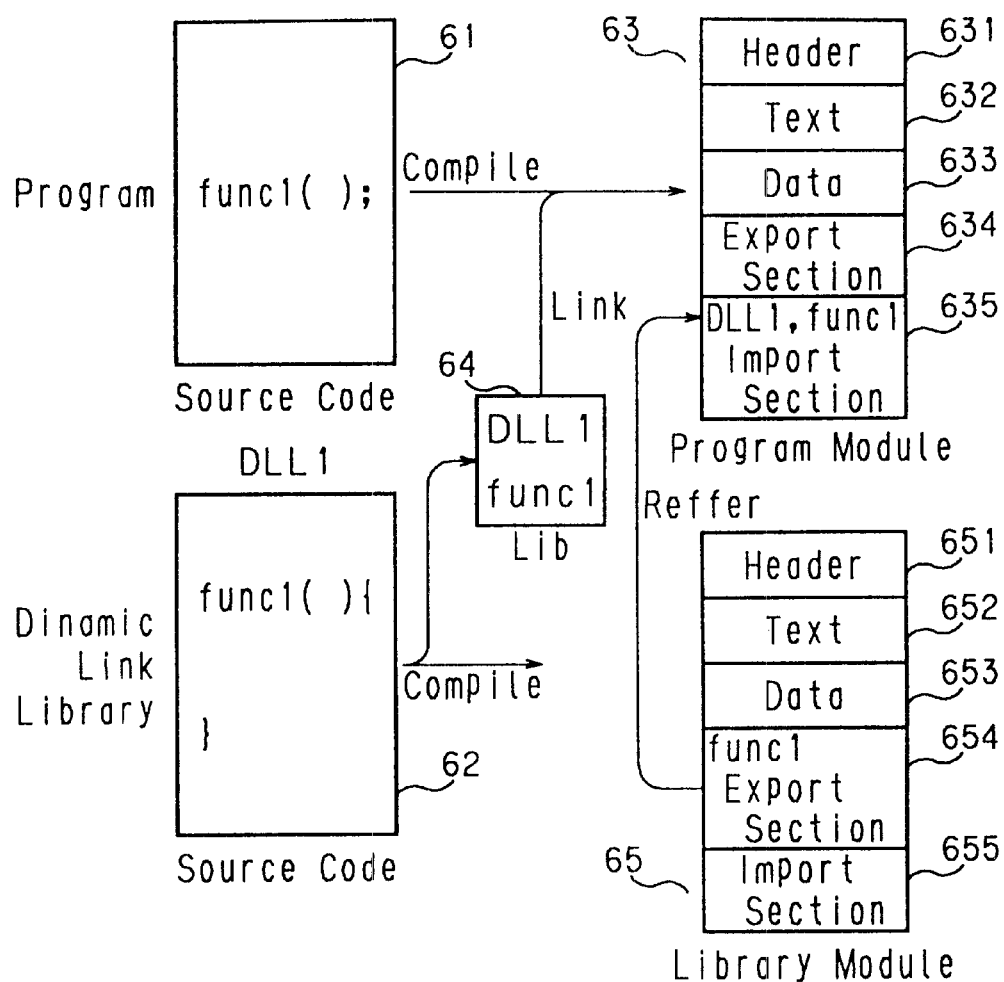
FIG. 6 is a diagram depicting a first symbol referring method, developed on a memory, which is to a to be used in each embodiment of the invention.

FIG. 6 shows a first symbol referring method. As source codes 61 or 62 of a program or a dynamic link library are compiled and linked, an object module 63 is generated. The object module 63 consists of a header 631, a text 632, data 633, an export section 634 and an import section 635. The export section 634 includes information of function symbols which allow the module to refer to another module. The import section 635 includes information (DLL1, func1; a set of the name of a library module which refers to a symbol and the name of the symbol) based on which the module refers to a function symbol from a library module. When a program directly calls a symbol (func1) which the dynamic link library DLL1 exports, a module 64 called an LIB file, which is generated as a result of compiling and linking the source codes of the DLL1, should be designated at the time of linkage.

Described in the LIB file are information of the library module name (DLL1) and the name of a symbol (func1) to be exported. As the program designates the LIB file at the time of linkage, information of the DLL1 and func1 are described in the import section 635 of the object module. When a program module is loaded on the memory during execution, the library module (DLL1) is also loaded according to the information described in the import section 635, and the load address of the func1 is written in the import section 635 of the program module. As a result, when the func1 is called during execution of the program module, the func1 of the DLL1 is executed in accordance with the address written in the import section 635.

A second symbol referencing method will be discussed using FIG. 7. As program module 73 executes a function (LoadLibrary) for dynamically loading a dynamic link library to load a library module (DLL1), and executes a function (GetProcAddress) for acquiring the address of a symbol which the loaded library module will export, the func1 can be executed. In this case, a program source code 71 need not designate the LIB file of the DLL1 at the time of linkage, and information of the library module name "DLL1" and the symbol name "func1" are not described in an import section 735. In the diagram, "71" denotes the source code of the program module and "73" denotes a program module (object program) which is generated by compiling the source code. The program module 73 consists of a header 731, text 732, data 733, export section 734 and import section 735, the same structure as used in the first symbol referring method illustrated in FIG. 6.

Figure 2:
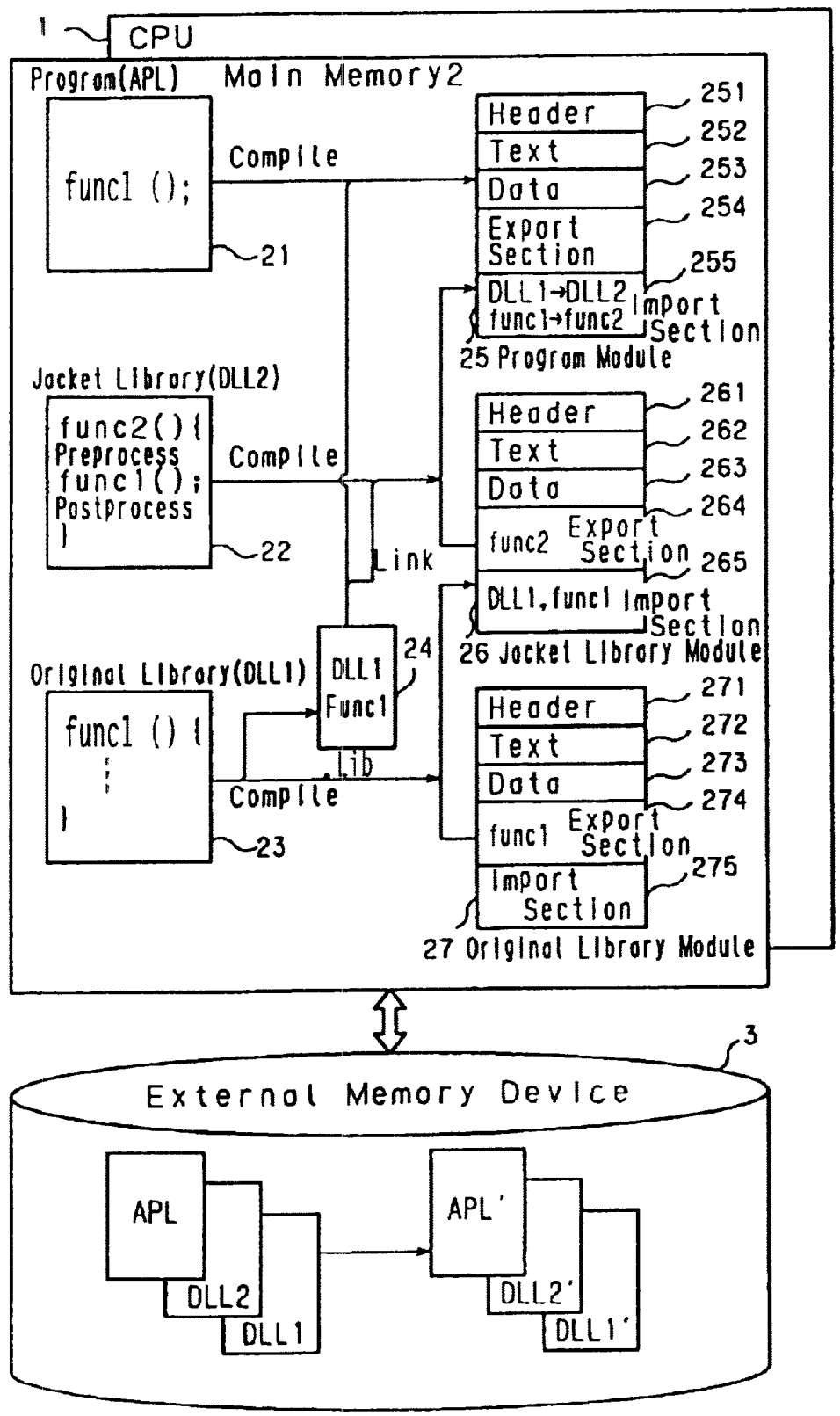
FIG. 2 is a diagram showing a program structure according to a first embodiment of the invention, developed on a memory.

FIG. 2 is an operational concept diagram illustrating one embodiment of the invention with the operation shown developed on the memory. Specifically, FIG. 2 shows an example of adding a preprocess or a postprocess to a function func1, without altering the module of the dynamic link library DLL1 in a case where the program module has called the function func1 which the dynamic link library DLL1 will export, using the first referring method shown in FIG. 6. A preprocess or a postprocess is a routine which is added to expand a function, like data saving or data restoration.

In the figure, "1" is a CPU, "2" is a main memory device and "3" is an external memory device, like a large-capacity hard disk. First, the CPU 1 generates a dynamic link library 22 (DLL2) including a function func2 which is a preprocess or a postprocess added to a program 21 (func1). Hereinafter, a function which is a preprocess or a postprocess to an original function is called a jacket routine, and a dynamic link library including a jacket routine is called a jacket library 22. As the source codes of the program 21 or the dynamic link library 22 or 23 are compiled and linked, a program module 25, a jacket library module 26 or an original library module 27 is generated.

As a LIB file 24 of the dynamic link library 23 (hereinafter called "original library (DLL1)") is designated at the time of linkage, the jacket library 22 (DLL2) imports the func1 that is to be exported by the original library DLL1 (23). As the module name "DLL1" and the symbol name "func1" described in an import section 255 of the program module 25 are respectively changed to DLL2 and func2, the jacket library 22 (DLL2) is loaded instead of the DLL1 and the address of the func2 is written in the import section 255, when the program module 25 is loaded into the main memory device 2. Accordingly, at the time of executing the program module, the func2 is called instead of the func1 and a preprocess or a postprocess can be added to the process of the func1.

Figure 8:
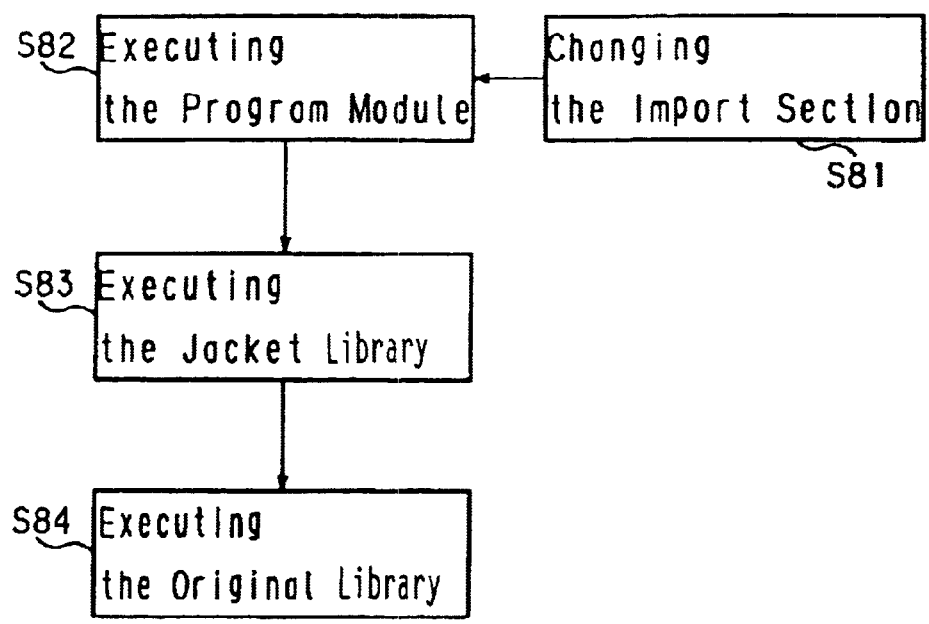
FIG. 8 is a flowchart illustrating control procedures according to the first embodiment of the invention.

FIG. 8 illustrates an operational flow when a program module is executed. As the import section is changed in the above-described procedures (step S82), and the program module 25, the jacket library 22 and the original library 23 are executed (steps S81, S83 and S84), it is possible to dynamically link the dynamic link library function and execute the program module.

Specifically, a preprocess or a postprocess can be added to a dynamic link library function and executed without changing the dynamic link library function, by replacing the dynamic link library name described in the header portion of the program module and a function name, which is to be referred to by the program module, with other names, linking and executing a dynamic link library, which includes a function whose name is the same as the replaced function name and has the same name as the replaced library name, instead of the original dynamic link library, executing the original dynamic link library function using the function having the same name as the replaced function name, and executing the preprocess or postprocess.

Figure 3:
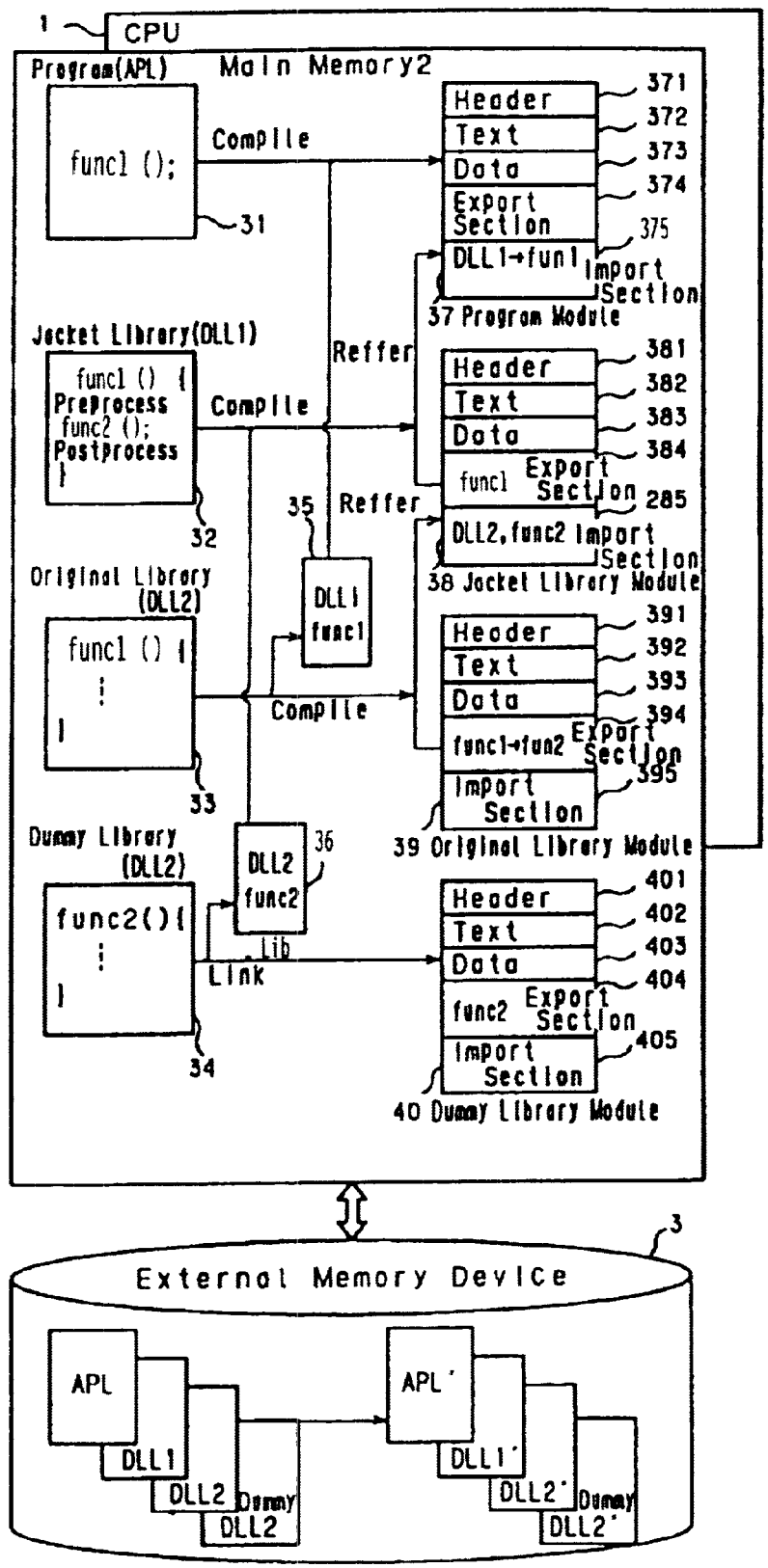
FIG. 3 is a diagram depicting a program structure according to a second embodiment of the invention, developed on a memory.

FIG. 3 shows an example of adding a preprocess or a postprocess to a function func1 without altering the program module in a case where the program module has called the function func1, which the dynamic link library DLL1 will export, using the first referencing method shown in FIG. 6. First, the jacket library DLL1 (32) that has the same name as the original dynamic link library DLL2 (33) is generated. As the name of the library (33) becomes identical to the name of the jacket library DLL1 (32), the name is of the original library is changed to DLL2. The jacket library DLL1 (32) exports the function func1 having the same name as the function func1 which the original library DLL2 (33) will export. The func1 which the jacket library DLL1 (32) will export internally calls the func1 which the original library DLL2 (33) will export, and adds a preprocess or a postprocess to the called func1. Since functions with the same name cannot be called, the symbol name "func1" described in an export section 394 of the original library DLL2 (33) is changed to func2. For the func1 which the jacket library DLL1 (32) will export, therefore, func2 should be called.

Referring to the func2, however, requires the LIB file 35 where the library module name "DLL2" and the symbol name "func2" are described. Because the module name "DLL1" and the symbol name "func1" are described in the LIB file 35 of the original library DLL2 (33), however, it is insignificant to link this LIB file 35. It is thus necessary to prepare an LIB file 31 which includes the library module name "DLL2" and the symbol name "func2." In this respect, a dummy dynamic link library 34 which has the library module name "DLL2" is prepared. The dummy library 34 (DLL2) includes a dummy function func2. Because the dummy function func2 is needed only to describe the symbol name "func2" in the LIB file 31, it can be empty. As the module name "DLL2" and the symbol name "func2" are described in the LIB file 31, which is acquired as a resulting of compiling the dummy library DLL2 (34), this LIB file 31 can be designated at the time of linking the jacket library DLL1 (32). When the func1 is called at the time of executing the program module, therefore, the func1 of the jacket library DLL1 is called so that a preprocess or a postprocess can be added to the process of the func1.

Figure 9:
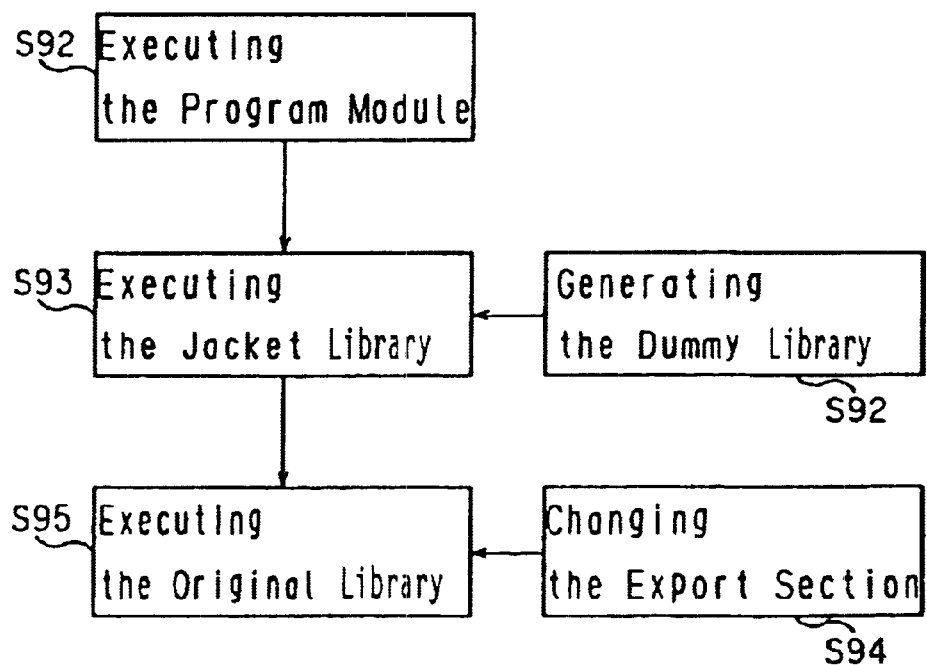
FIG. 9 is a flowchart illustrating control procedures according to the second embodiment of the invention.

FIG. 9 shows the operational flow. It becomes possible to dynamically link the dynamic link library function and execute the program by executing the program module (step S91), generating the dummy library in the above-described procedures (step S92) followed by the execution of the jacket library (step S93), and then changing the export section in the above-described procedures (step S94) followed by the execution of the original library (step S95).

Specifically, in a dynamic link library (A) which is dynamically linked at the time of executing a program module 37, a dynamic link library (B) which has the same name as the dynamic link library (A) and includes functions having the same names as those of functions included in the dynamic link library (A) is dynamically linked and executed at the time of executing the program module 37, the dynamic link library name and an externally referable function name, described in the original dynamic link library (A), are replaced with other names, a function in the original dynamic link library (A) is executed from a function in the dynamic link library (B), and a preprocess or a postprocess is executed. This allows a preprocess or postprocess to be added to the dynamic link library function and executed without altering the program module 37.

Figure 4:
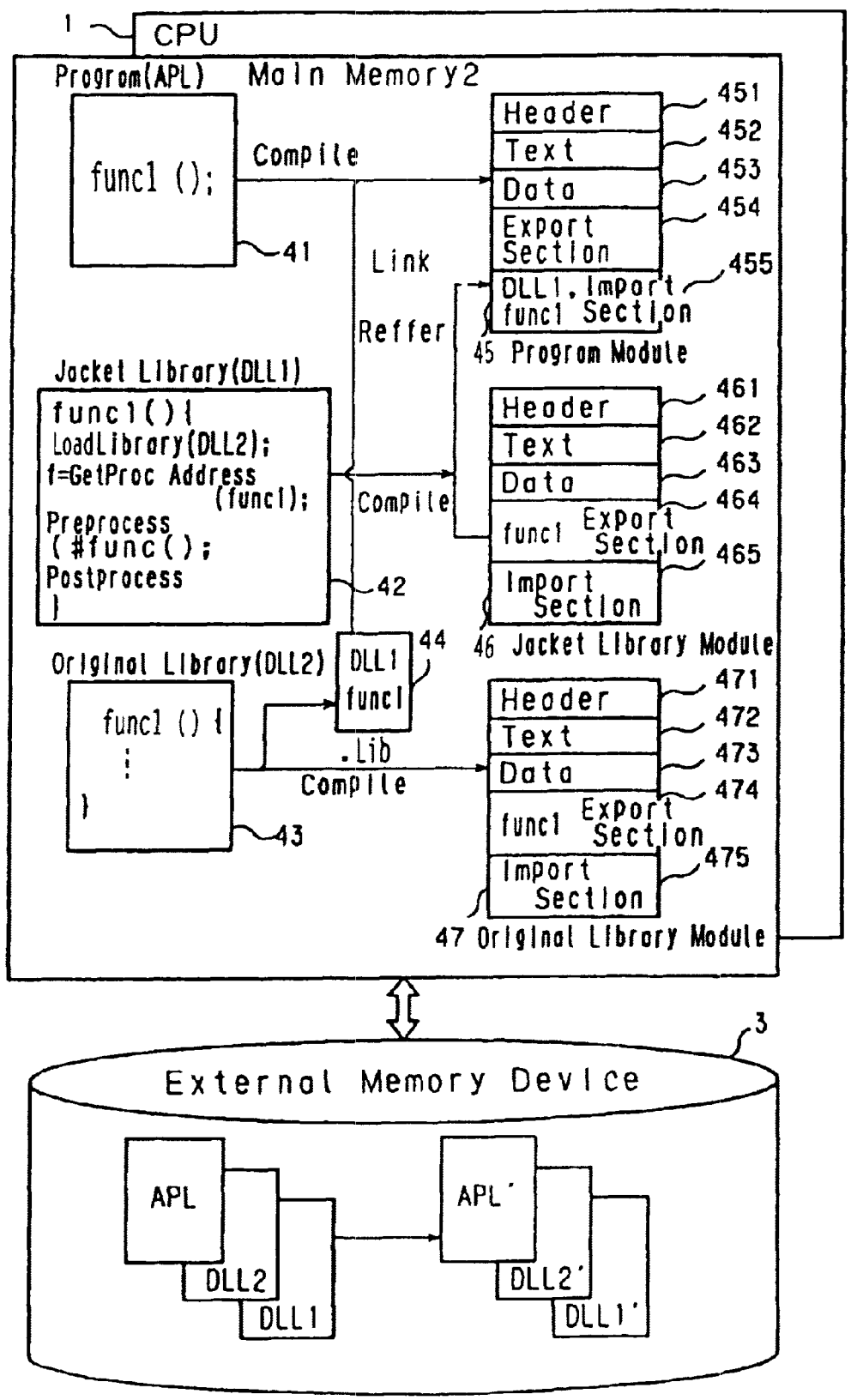
FIG. 4 is a diagram illustrating a program structure according to a third embodiment of the invention, developed on a memory.

FIG. 4 shows an example of adding a preprocess or a postprocess to a function func1 without altering both the program module and the module of the dynamic link library DLL1 in a case where the program module has called the function func1 which the dynamic link library DLL1 will export, using the first referring method shown in FIG. 6.

First, the jacket library DLL1 (42) which has the same name as the original dynamic link library DLL1 (43) is generated. The jacket library DLL1 (42) exports the function func1 having the same name as the function func1 which the original library (43) will export. As the name of the original library (43) becomes identical to the name of the jacket library DLL1 (42), the name is of the original library is changed to DLL2. The func1 which the jacket library DLL1 (42) will export executes a function LoadLibrary to dynamically load a dynamic link library, thereby loading the original library DLL2 (43), and executes a function GetProcAddress for acquiring the address of a symbol which the loaded dynamic link library will export. Accordingly, the func1 which the jacket library DLL1 (42) will export can internally call the func1 which the original library DLL1 (43) will export, and can add a preprocess or a postprocess to the called func1.

Figure 10:
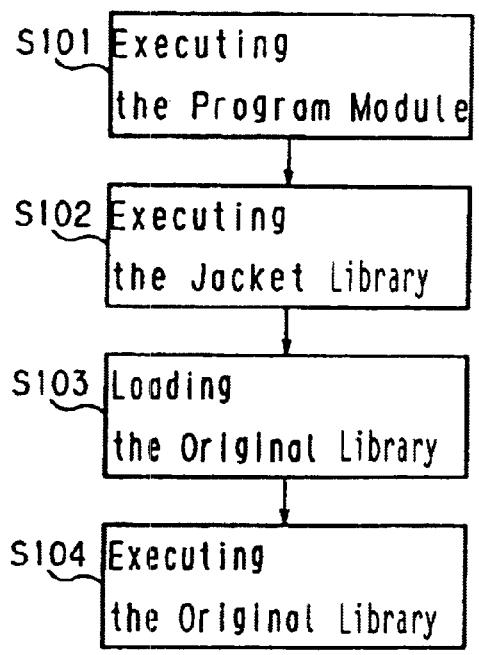
FIG. 10 is a flowchart illustrating control procedures according to the third embodiment of the invention.

When the func1 is called at the time of executing a program module 45, therefore, the func1 of the jacket library DLL1 is called so that a preprocess or a postprocess can be added to the process of the func1. FIG. 10 shows the operational flow. It is possible to dynamically link and execute the dynamic link library function by executing the individual steps of executing the program module first (step S101), then executing the jacket library (step S102), loading the original library (step S103) and executing the original library (step S104).

Specifically, in a dynamic link library (A) which is dynamically linked at the time of executing the program module, a dynamic link library (B) which has the same name as the dynamic link library (A) and includes functions having the same names as those of functions included in the dynamic link library (A) is dynamically linked and executed at the time of executing the program module, the dynamic link library (A) is dynamically loaded from a function in the dynamic link library (B) (step S103), a function in the original dynamic link library (A) is executed and a preprocess or a postprocess is executed by using a function for acquiring the execution address of the dynamic link library function included in the loaded dynamic link library (A). This way allows a preprocess or postprocess to be added to the dynamic link library function and executed without altering the program module and the dynamic link library module.

Figure 5:
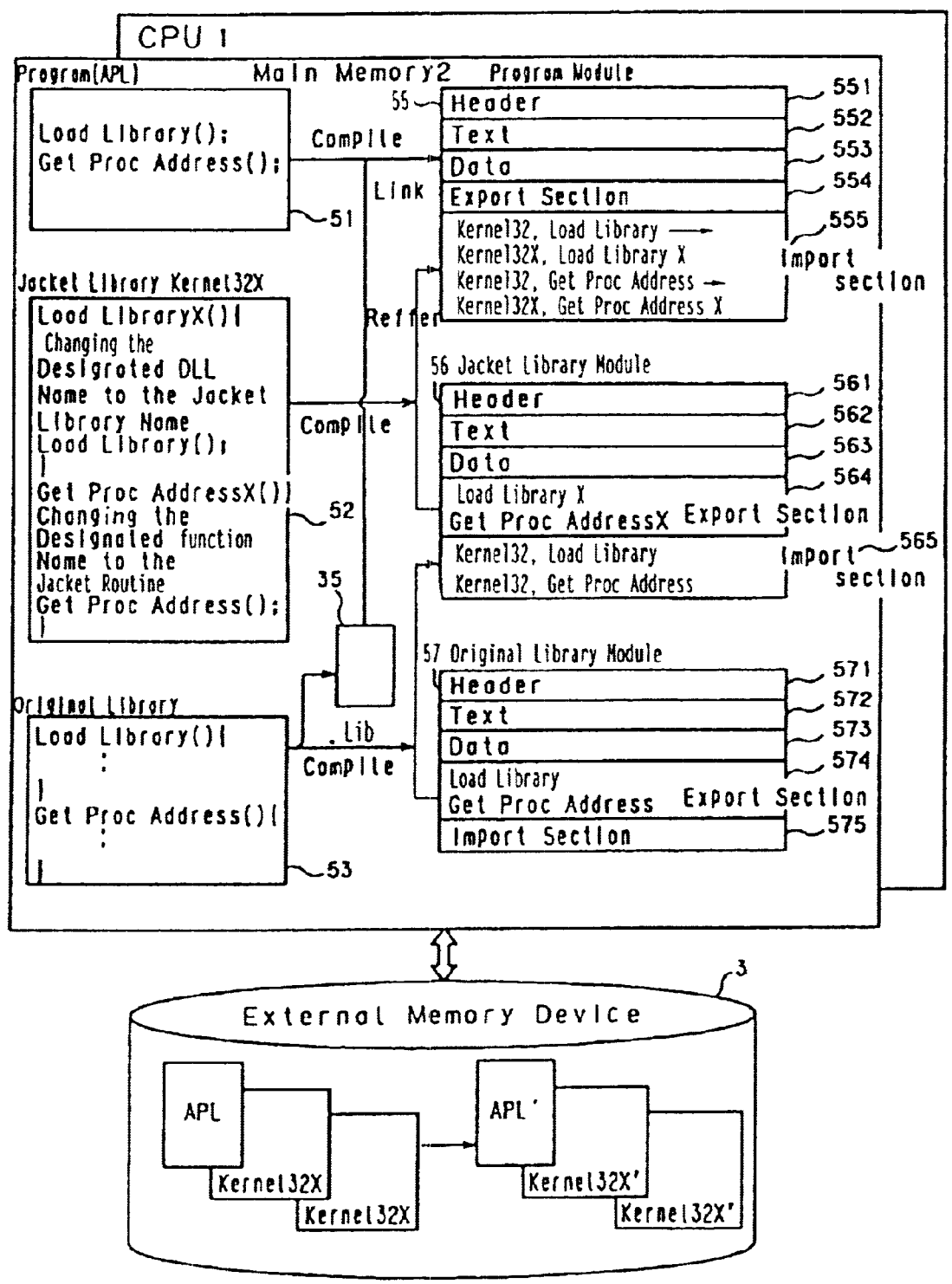
FIG. 5 is a diagram showing a program structure according to a fourth embodiment of the invention, developed on a memory.
Figure 7:
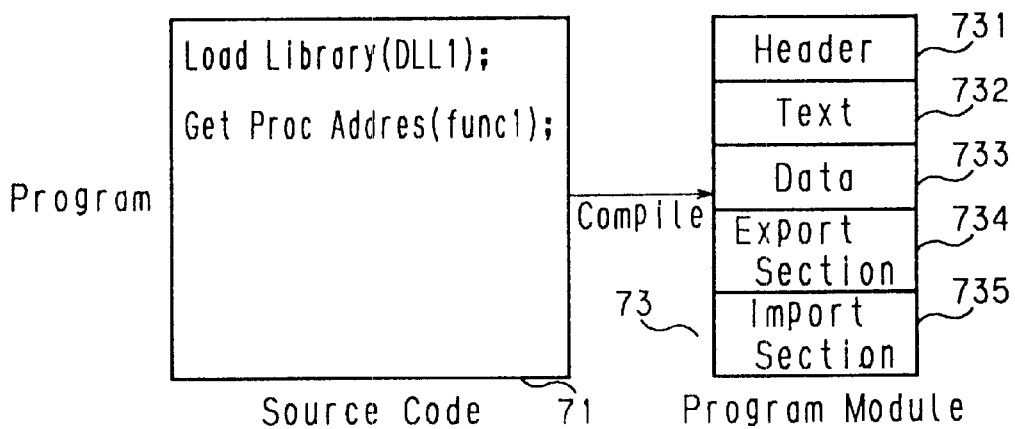
FIG. 7 is a diagram showing a second symbol referring method, developed on a memory, which is to a to be used in each embodiment of the invention.

FIG. 5 shows an example of adding a preprocess or a postprocess to a function func1 without altering the module of the dynamic link library DLL1 in a case where the program module has called the function func1 which the dynamic link library DLL1 will export, using the second referring method shown in FIG. 7. To accomplish the addition, a process of changing the designated dynamic link library name to the jacket library name and a process of changing the designated symbol name to a symbol name which the jacket library will export are respectively added a function LoadLibrary for dynamically loading a dynamic link library and a function GetProAddress for acquiring the address of a symbol which the loaded dynamic link library will export, by using the method illustrated in FIG. 2 or FIG. 3.

First, a jacket library Kernel32X (52) of a kernel 32 which is a dynamic link library including the functions LoadLibrary and GetProAddress is prepared. The jacket library Kernel32X (52) includes a function LoadLibraryX where a process of internally calling the function LoadLibrary and changing the given dynamic link library name to a jacket name is added, and a function GetProAddressX where a process of internally calling the function GetProAddress and changing the given symbol name to a jacket routine name is added.

Then, the module name "Kernel32" described in an import section 555 of a program module 55 is rewritten to the jacket library name "Kernel32X," and the symbol names "LoadLibrary" and "GetProcAddress" to "LoadLibraryX" and "GetProcAddressS" respectively. Accordingly, when the functions LoadLibrary and GetProAddress are called during execution of the program module 55, the jacket routines LoadLibraryX and GetProcAddressS are executed. By replacing the dynamic link library name "DLL1" or the symbol name "func1", shown in, for example, FIG. 6, is replaced with the jacket name "DLL2" or the jacket routine name "func2" when the name "DLL1" or "func1" is given to the function LoadLibraryX or GetProAddressX, therefore, the function func2 which the jacket library DLL2 will export is executed when the function func1 which the dynamic link library DLL1 will export is called during execution of the program module 55. It is thus possible to add a preprocess or a postprocess to the process of the func1.

Figure 11:
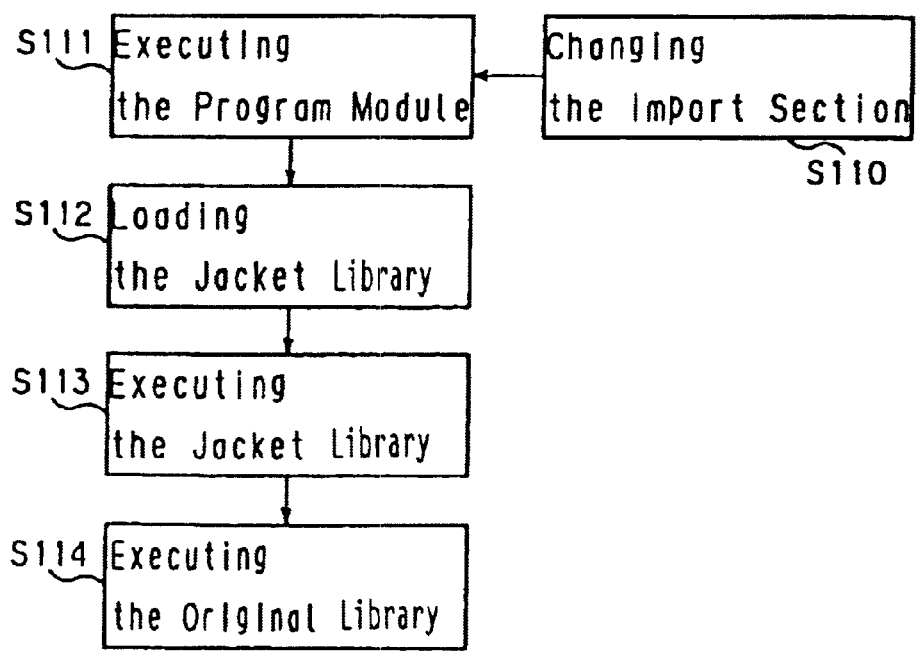
FIG. 11 is a flowchart illustrating control procedures according to the fourth embodiment of the invention.

FIG. 11 shows the operational flow. It is possible to dynamically link the dynamic link library function and execute the preprocess or postprocess specifically by changing the import section according to the above-described procedures (step S111) followed by the execution of the program module (step S112), loading the jacket library (step S113), executing the jacket library (step S114), and executing the original library (step S115).

Specifically, in a program module which, at the time of execution, dynamically links and executes a dynamic link library function by using a function (a) for dynamically loading a dynamic link library, a process of replacing the name of a dynamic link library which is requested to be loaded with another name is added to the function (a) by using the method shown in FIG. 1 or FIG. 2. Accordingly, the load-requested dynamic link library is replaced with another dynamic link library without altering the dynamic link library or without altering the program module.

Further, by adding a process of replacing the name of a function whose execution address is requested with another name by using the method shown in FIG. 2 or FIG. 3 to a function (b) of for acquiring the execution address of a function included in the dynamic link library that has dynamically been loaded by the program module, the function whose execution address has been requested is replaced with another function without altering the dynamic link library or without altering the program module.

As apparent from the foregoing description, this invention is characterized in that in a program module, which implements dynamic linkage to an external function and executes the external function, a function name described in a header portion of a program module and a function name to be referred to by the program module are replaced with other names, and functions having the same names as the replaced function names are linked and executed instead of the original function, and a preprocess or a postprocess is executed, thereby allowing a function to be expanded without altering the original function. With this feature, at the time of generating a dynamic link library including a dynamic link library function (Y), the amount of codes to be newly added or generated for other portions of the dynamic link library function (Y) than those which are to be changed can be suppressed as much as possible. This can ensure more efficient alteration of a dynamic link library function and can reduce the developing cost.

It should be apparent to those skilled in the art that other advantages and other modifications of the present invention may be obtained easily. Therefore, this invention is not limited to the details, the specific apparatuses, and the present examples all given herein. Therefore, the invention may be modified in many other specific forms within the scope of the appended claims and without departing from the spirit and scope of the invention defined by the scope equivalent to that of the appended claims.

What is claimed is:

1. A method of linking a program module, which implements dynamic linkage to an external function and executes said external function, said method comprising the steps of:

replacing an original function name described in a header portion of the program module and referred to by said program module with a new name;

linking a function having the same name as the new name and executing said linked function in place of an original function associated with the original function name; and executing the original function using the linked function, and a preprocess or a postprocess for the original function to expand said original function without altering the original function.

2. A method of linking a program module, which implements dynamic linkage to an external original library A comprising a library function A and executes said function A at a time of executing said program module, wherein the method comprises:

dynamically linking to a library B having a function with the same name as said function A;

executing the function with the same name as said function A at a time of executing said program module;

replacing a function name of the library function A, which can externally be referred to, with a new name; and calling the library function A with the new name in said original library A from the function with the same name as said function A in said library B and executing said library function A, wherein the function with the same name as said function A in said library B describes and executes a preprocess or a postprocess, whereby said preprocess or postprocess expands the library function A without altering said program module.

3. A method of linking a program module, which implements dynamic linkage to an external function A and executes said external function A, wherein a library A includes the external function A, wherein the method comprises:

dynamically linking, at a time of executing the program module, to a library B having the same name as said library A and including a function B having the same name as the function A included in said library A; and executing said function B in library B at a time of executing said program module;

dynamically loading said library A from the function B in said library B, and executing the function A in said original library A by using a function for acquiring an execution address of a library function included in said library A;

wherein said function B describes and executes a preprocess or a postprocess, whereby said preprocess or postprocess is added to expand the library function A without altering said program module and a library module associated with library A.

4. The method according to claim 3, wherein dynamically loading a library upon execution replacing the name of the library A requested to be loaded with the name of library B, whereby said library A requested to be loaded is replaced with the library B without altering the library A or said program module.

5. The method according to claim 4, wherein dynamically loading a library upon execution includes for replacing the name of the function A whose execution address is requested with the name of the function B, whereby said function A whose execution address is requested is replaced with the function B without altering said library A or said program module.

6. A computer system for dynamically linking a program module to an external function to be used by said program module and executing said program module, said computer system comprising:

means for replacing an original function name described in a header portion of said program module and a function name to be referred to by said program module with a new name; and means for linking a function having the same name as the new name and executing said linked function in place of an original function associated with the original function name;

means for executing the original function using the linked function, and executing a preprocess or a postprocess, whereby the original function is expanded without altering the original function.

7. A computer system for dynamically linking a program module to an external original library A comprising a library function A and executing said program module at a time of executing said program module, the computer system comprising:

means for dynamically linking said program module to a library B having a function with the same name as said library function A; means for executing the function with the same name as said function A at a time of executing said program module;

means for replacing a function name, which can externally be referred to, with a new name, and executing a function in said original library A from a function in said library B; and means for executing a preprocess or a postprocess, whereby said preprocess or postprocess expands the library function A without altering said program module.

8. A computer system for dynamically linking a program module to a library A comprising external function A to be used by said program module at a time of executing said program module, said computer system comprising:

means for dynamically linking said program module to a library B having the same name as said library A and including a function B having the same name as function A in said library A, and executing said function B in the library B at a time of executing said program module;

means for dynamically loading said library A from the function B in said library B, and executing the function A in said library A by using a function for acquiring an execution address of the library function A included in said library A; and means for said library A to be dynamically linked at a time of executing said program module, dynamically loading said library A from a function in said library B, executing a function in said library A by using a function for acquiring an execution address of a library function included in said library A; and means for executing a preprocess or a postprocess, whereby said preprocess or postprocess expands the library function A without altering said program module and the library A.

9. The computer system according to claim 8, wherein the means for dynamically loading a library upon execution further comprises means for adding a process for replacing the name of the library A requested to be loaded with the name of library B, whereby said library requested to be loaded is replaced with the library B without altering the library A or said program module.

10. The computer system according to claim 9, further comprising means replacing the name of the function A, whose execution address is requested, with the name of the function B, whereby said function whose execution address is requested is replaced with the function B without altering said library A or said program module.

11. A computer-readable recording medium for use in a computer system to perform a method for dynamically linking a program module to an external function to be used by said program module and executing said program module, the method comprising:

(a) replacing an original function name described in a header portion of said program module and the original function name referred to by said program module with a new name;

(b) linking a function with the same name as the new name and executing said linked function in place of an original function associated with the original function name;

(c) executing the original function using the linked function and executing a preprocess or a postprocess to expand the original function without altering the original function.

12. A computer-readable recording medium for use in a computer system to perform a method for dynamically linking a program module to an external original library A comprising a library function A to be used by said program module at a time of executing said program module, the method comprising:

(a) dynamically linking said program module to a library B having a function with the same name as said function A, and executing the function with the same name as said function A at the time of executing said program module;

(b) replacing a function name of the library function A, which can externally be referred to, with a new name; and (c) executing the function A in said original library A from the function B in said library B and executing a preprocess or a postprocess to expand the function A in said original library A without altering the function the library A.

13. A computer-readable recording medium for use in a computer system to perform a method for dynamically linking a program module to an external library A comprising a function A to be used by said program module and executing said program module, the method comprising:

(a) dynamically linking said program module to a library B having the same name as said library A and including a function B having the same names function A included in said library A, and executing said function B in the library B at a time of executing said program module; and (b) dynamically loading said library A from the function B in said library B, and executing the function A in said library A by using a function for acquiring an execution address of the library function A included in said library A, and executing a preprocess or a postprocess to expand the function A in said original library A without altering the function A in said original library A.

14. The computer-readable recording medium according to claim 13, the method further comprising replacing a name of the library A requested to be loaded with the name of library B, whereby said library requested to be loaded is replaced with the library B without altering said library A or said program module.

15. The computer-readable recording medium according to claim 14, the method further comprising replacing the name of the function A whose execution address is requested with the name of the function B, whereby said function whose execution address is requested is replaced with the function B without altering said library A or said program module.

* * * * *